(12) United States Patent
Lin et al.

(10) Patent No.: US 11,875,097 B1
(45) Date of Patent: Jan. 16, 2024

(54) CORE LOSS SIMULATOR AND SIMULATION METHODS

(71) Applicant: Ansys, Inc., Canonsburg, PA (US)

(72) Inventors: Dingsheng Lin, Venetia, PA (US); Ping Zhou, Bethel Park, PA (US); Chuan Lu, Bridgeville, PA (US); Ningning Chen, Bridgeville, PA (US); Wei Yuan, Sewickley, PA (US)

(73) Assignee: Ansys, Inc., Canonsburg, PA (US)

( * ) Notice: Subject to any disclaimer, the term of this patent is extended or adjusted under 35 U.S.C. 154(b) by 827 days.

(21) Appl. No.: 16/145,773

(22) Filed: Sep. 28, 2018

Related U.S. Application Data

(60) Provisional application No. 62/565,198, filed on Sep. 29, 2017.

(51) Int. Cl.
  *G06F 30/23* (2020.01)
  *G06F 111/10* (2020.01)
  *G06F 111/20* (2020.01)

(52) U.S. Cl.
  CPC .......... *G06F 30/23* (2020.01); *G06F 2111/10* (2020.01); *G06F 2111/20* (2020.01)

(58) Field of Classification Search
  CPC .. G06F 30/23; G06F 2111/20; G06F 2111/10; G06F 30/20
  USPC .......................................................... 703/2
  See application file for complete search history.

(56) References Cited

U.S. PATENT DOCUMENTS

| | | | |
|---|---|---|---|
| 7,394,463 B2 * | 7/2008 | Tani | G06F 30/23 345/420 |
| 2005/0055183 A1 * | 3/2005 | Tani | G06T 17/30 703/2 |
| 2007/0058455 A1 * | 3/2007 | Usami | G06F 30/23 365/189.07 |

(Continued)

FOREIGN PATENT DOCUMENTS

| | | | | |
|---|---|---|---|---|
| CN | 104182580 A | * | 12/2014 | |
| JP | 2001155055 A | * | 6/2001 | G06T 17/20 |
| JP | 2007293379 A | * | 11/2007 | |

OTHER PUBLICATIONS

Xingxing Zhang, Stranded Core Transformer Loss Analysis, Apr. 10, 2008 (Year: 2008).*

(Continued)

*Primary Examiner* — Boris Gorney
*Assistant Examiner* — David A Hopkins
(74) *Attorney, Agent, or Firm* — Jones Day

(57) ABSTRACT

Systems and methods are provided. A physical measurement of the core loss increase associated with a physical deformation of a material of the device is obtained. A data structure describing a model of the device is accessed. A first edge of the model of the device associated with a physical deformation of the device is identified. A finite element mesh is generated to include a single layer mesh comprising a plurality of mesh elements associated with the first edge of the finite element mesh. A core loss value is assigned to each of the plurality of mesh elements. Each of the core loss values representative of the physical measurement of the core loss increase of the material as a result of the physical deformation of the material. An electromagnetic model is generated by performing a finite element analysis based on the finite element mesh and the single layer mesh.

16 Claims, 11 Drawing Sheets

(56) References Cited

U.S. PATENT DOCUMENTS

| | | | | |
|---|---|---|---|---|
| 2017/0364608 A1* | 12/2017 | Huang | .................... | G06F 30/00 |
| 2018/0239853 A1* | 8/2018 | Shimizu | .................. | G06F 30/23 |
| 2018/0322231 A1* | 11/2018 | Campbell | ............... | G06F 30/23 |

OTHER PUBLICATIONS

ANSYS Inc., User's Guide Maxwell 3D, Mar. 13, 2012 (Year: 2012).*

Andreas Krings, Iron Losses In Electrical Machines, Apr. 2014 (Year: 2014).*

Vandenbossche, Lode, et al. "Iron loss modelling which includes the impact of punching, applied to high-efficiency induction machines." 2013 3rd International Electric Drives Production Conference (EDPC). IEEE, 2013. (Year: 2013).*

Bali, Madeleine, Herbert De Gersem, and Annette Muetze. "Finite-element modeling of magnetic material degradation due to punching." IEEE Transactions on Magnetics 50.2 (2014): 745-748. (Year: 2014).*

Handgruber, Paul, et al. "Three-dimensional eddy-current analysis in steel laminations of electrical machines as a contribution for improved iron loss modeling." IEEE Transactions on Industry Applications 49.5 (2013): 2044-2052. (Year: 2013).*

Bali, Madeleine, Herbert De Gersem, and Annette Muetze. "Determination of original nondegraded and fully degraded magnetic characteristics of material subjected to laser cutting." IEEE Transactions on Industry Applications 53.5 (2017): 4242-4251. (Year: 2017).*

Bali, Madeleine, Herbert De Gersem, and Annette Muetze. "Determination of original nondegraded and fully degraded magnetic properties of material subjected to mechanical cutting." IEEE Transactions on Industry Applications 52.3 (2016): 2297-2305. (Year: 2016).*

Bourchas, Konstantinos, et al. "Quantifying effects of cutting and welding on magnetic properties of electrical steels." IEEE Transactions on Industry Applications 53.5 (2017): 4269-4278. (Year: 2017).*

Elfgen, S., et al. "Continuous local material model for cut edge effects in soft magnetic materials." IEEE Transactions on Magnetics 52.5 (2015): 1-4. (Year: 2015).*

Fujisaki, Keisuke, et al. "Motor core iron loss analysis evaluating shrink fitting and stamping by finite-element method." IEEE Transactions on Magnetics 43.5 (2007): 1950-1954. (Year: 2007).*

Holopainen, Timo P., Paavo Rasilo, and Antero Arkkio. "Identification of magnetic properties for cutting edge of electrical steel sheets." IEEE Transactions on Industry Applications 53.2 (2016): 1049-1053. (Year: 2016).*

Mecrow, B. C., and A. G. Jack. "The modelling of segmented laminations in three dimensional eddy current calculations." IEEE transactions on magnetics 28.2 (1992): 1122-1125. (Year: 1992).*

Rasilo, Paavo, et al. "Analysis of iron losses on the cutting edges of induction motor core laminations." 2016 XXII International Conference on Electrical Machines (ICEM). IEEE, 2016. (Year: 2016).*

Sundaria, Ravi, et al. "Higher-order finite element modeling of material degradation due to cutting." 2017 IEEE International Electric Machines and Drives Conference (IEMDC). IEEE, 2017. (Year: 2017).*

Sundaria, Ravi, et al. "Mixed-order finite-element modeling of magnetic material degradation due to cutting." IEEE Transactions on Magnetics 54.6 (2018): 1-8. (Year: 2018).*

Bekka, Nassim, et al. "A novel methodology for optimal design of fractional slot with concentrated windings." IEEE Transactions on Energy Conversion 31.3 (2016): 1153-1160. (Year: 2016).*

Burkardt, "Computational Geometry Lab: TETRAHEDRONS", Virginia Tech, Dec. 23, 2010, URL: people(dot)sc(dot)fsu(dot)edu/~jburkardt/presentations/cg_lab_tetrahedrons(dot)pdf (Year: 2010).*

Goldbeck, G., et al. "Numerical implementation of local degradation profiles in soft magnetic materials." 2018 XIII International Conference on Electrical Machines (ICEM). IEEE, 2018. (Year: 2018).*

Havez, Léon, Emmanuel Sarraute, and Yvan Lefèvre. "3D Power inductor: calculation of iron core losses." COMSOL Conference. 2013. (Year: 2013).*

Malliband, P. D., and R. A. McMahon. "Implementation and calorimetric verification of models for wide speed range three-phase induction motors for use in washing machines." Conference Record of the 2004 IEEE Industry Applications Conference, 2004. 39th IAS Annual Meeting . . . vol. 4. IEEE, 2004. (Year: 2004).*

Walecki, K., and K. Zakrzewski. "The iron losses calculation in the armature of the electromagnetic torque converter." The XIX International Conference on Electrical Machines—ICEM 2010. IEEE, 2010. (Year: 2010).*

* cited by examiner

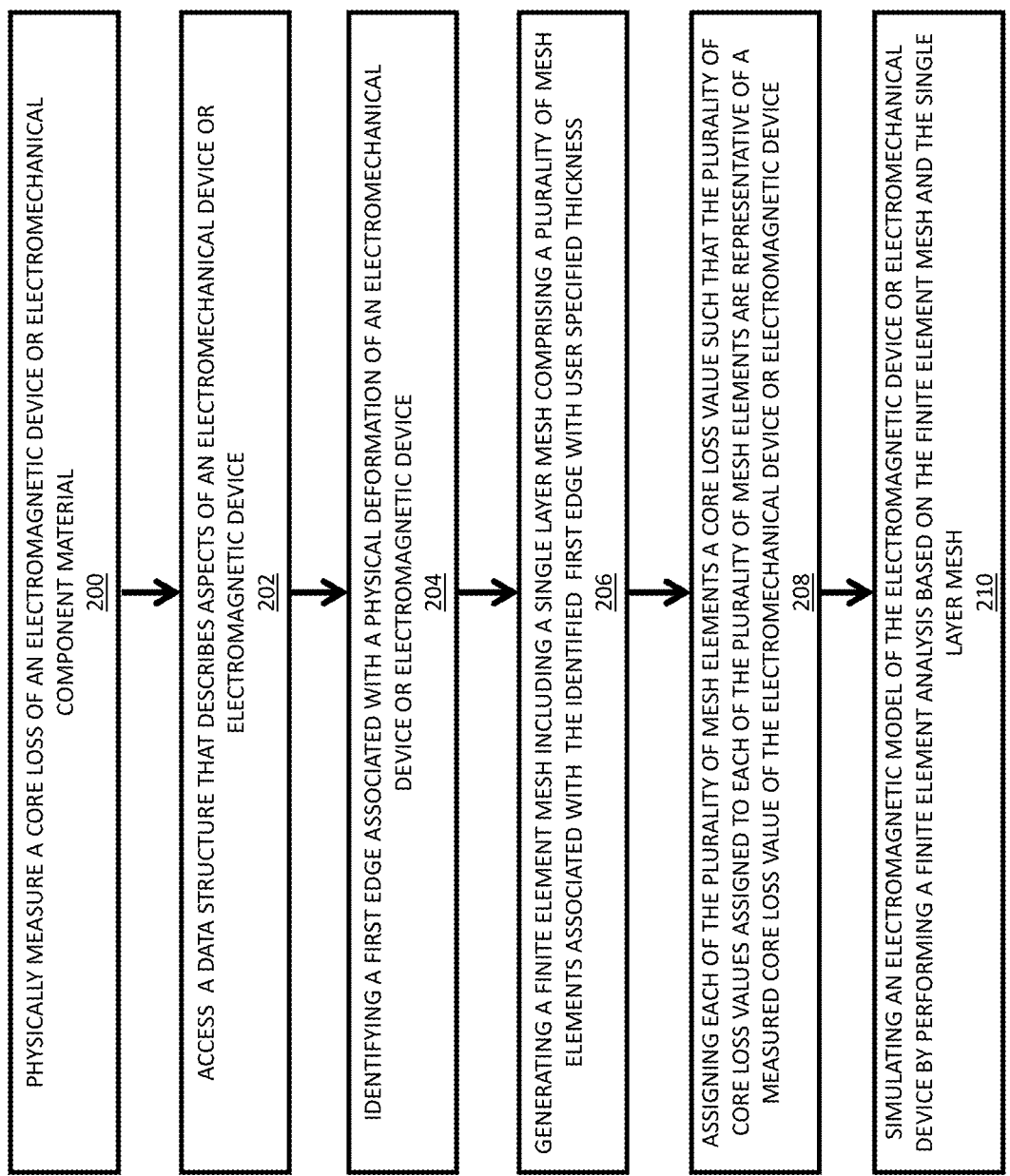

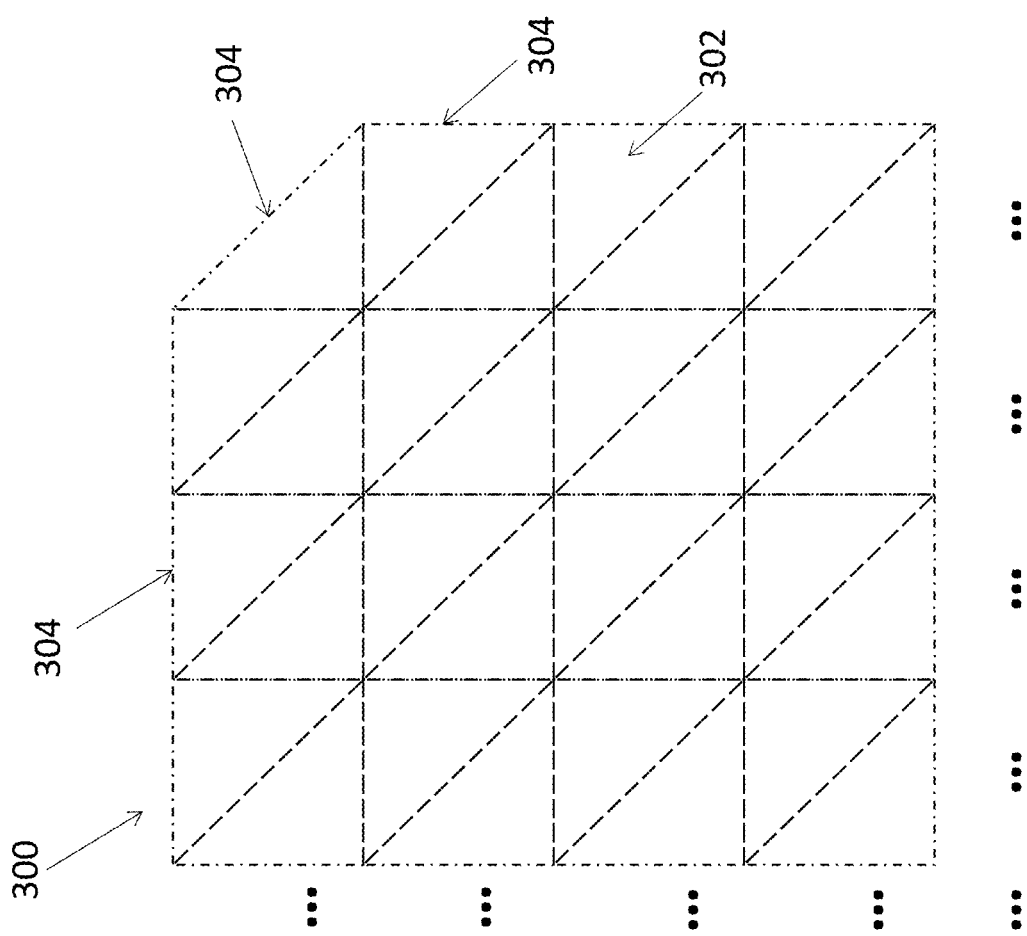

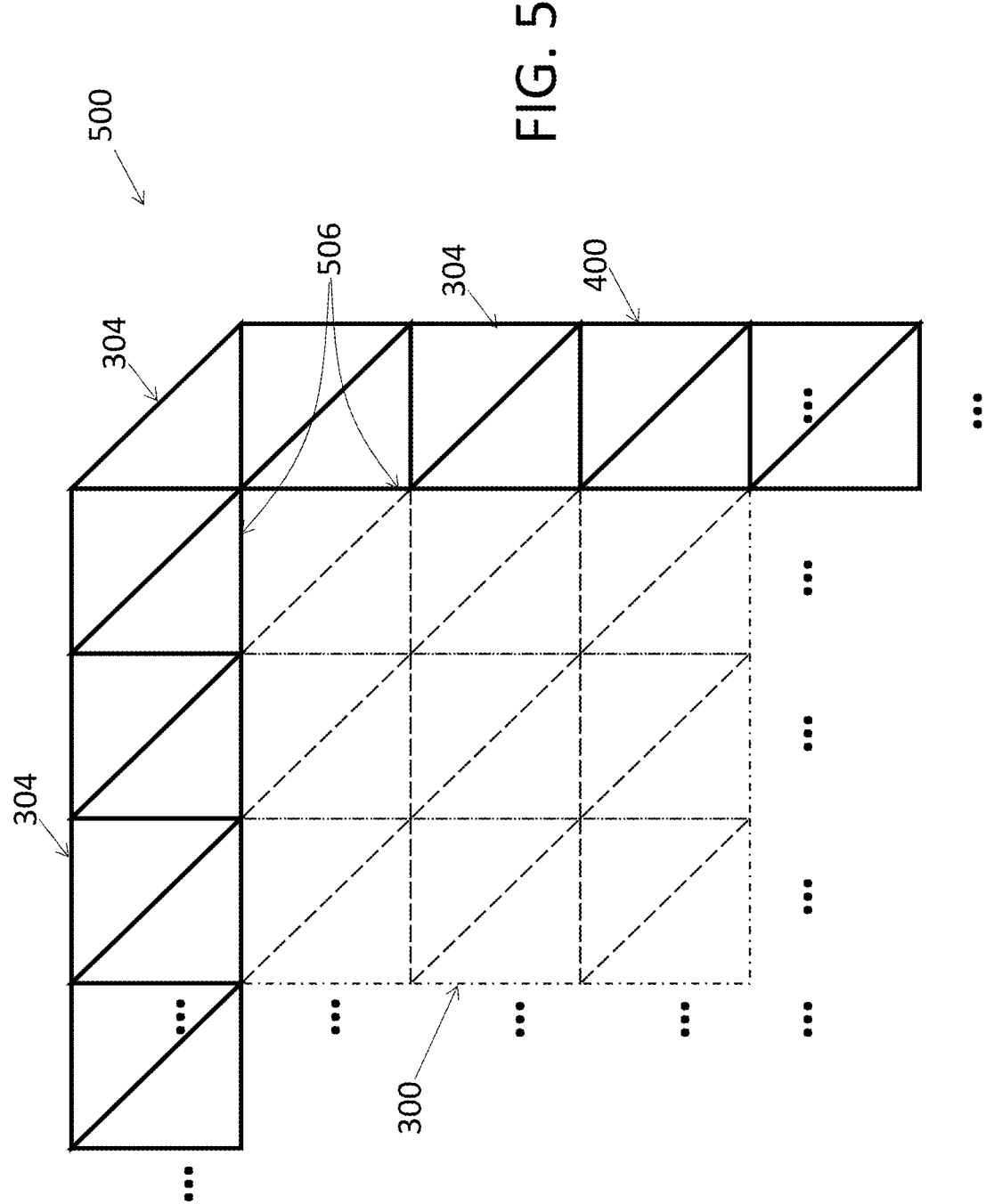

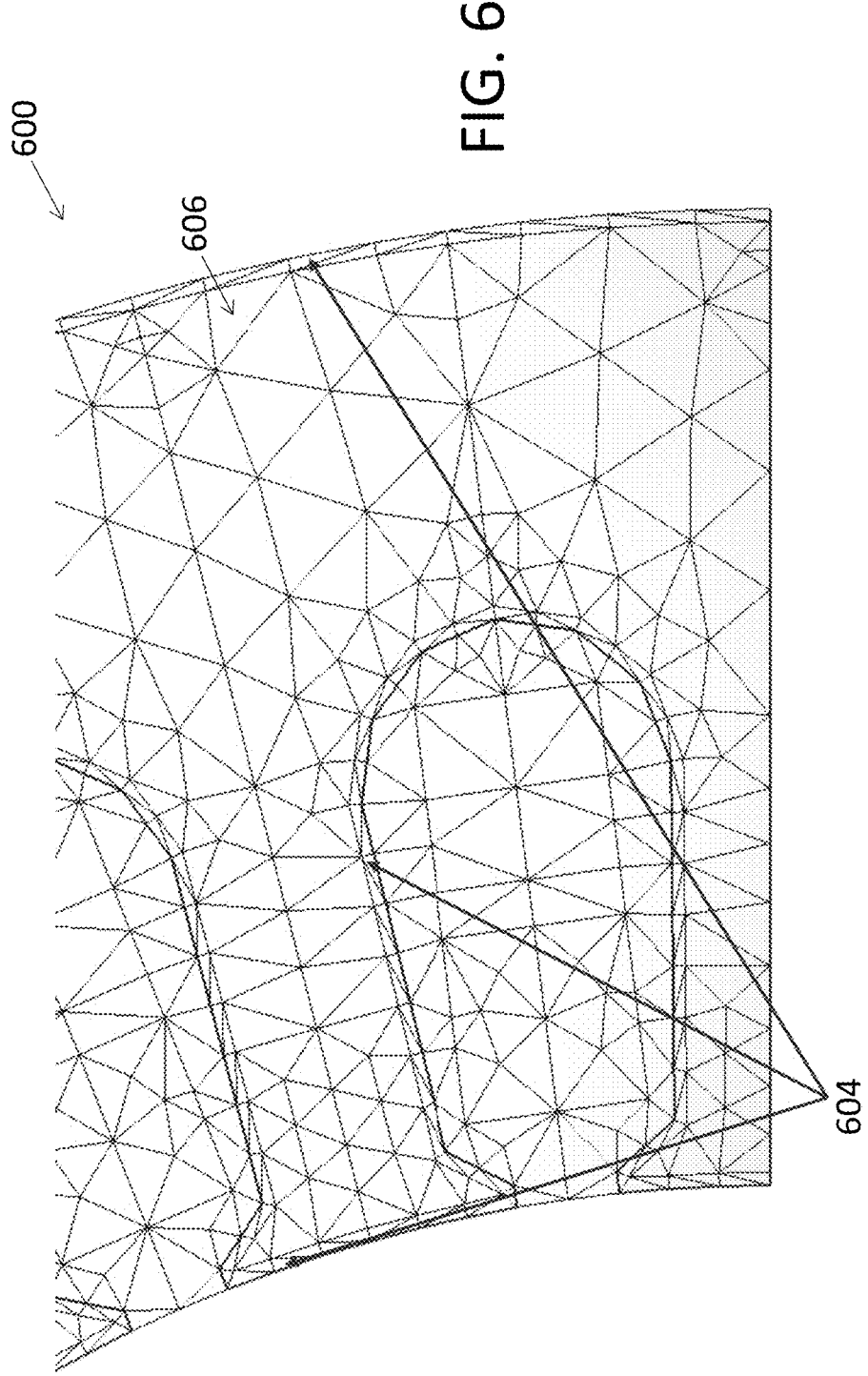

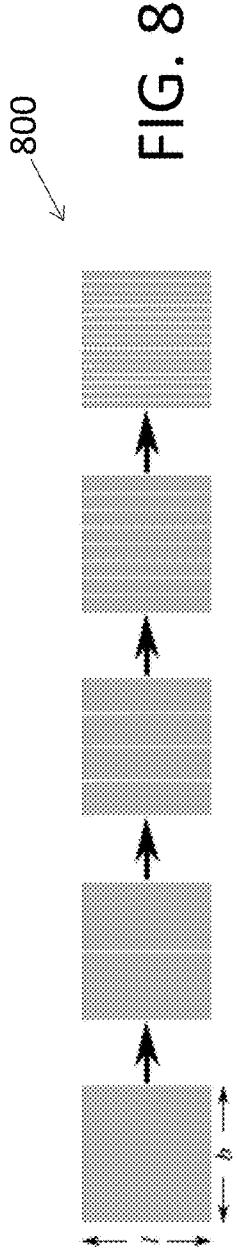
FIG. 8
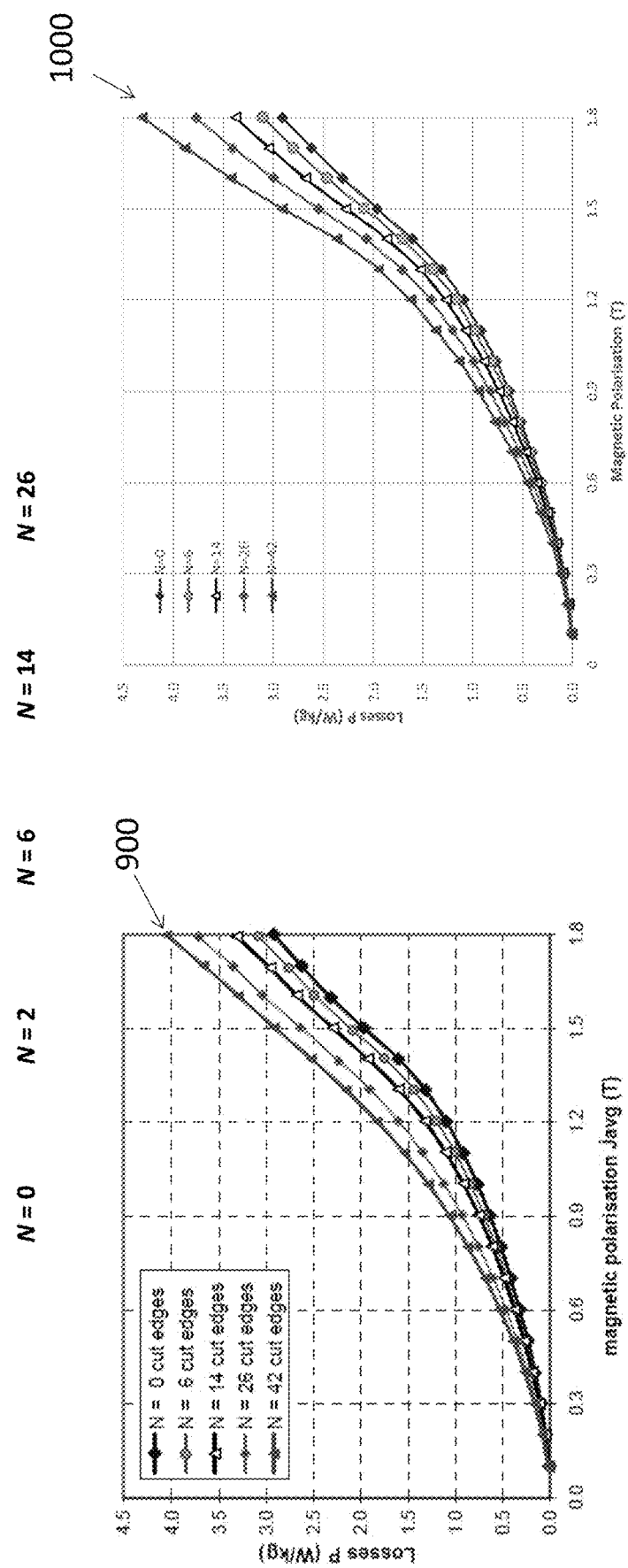
FIG. 9
FIG. 10

Not-consider cut-edge effect

CORE LOSS SIMULATOR AND SIMULATION METHODS

CROSS-REFERENCE TO RELATED APPLICATION

This application claims priority to U.S. Provisional Application No. 62/565,198, filed Sep. 29, 2017, entitled "Improved Core Loss Simulator and Simulation Methods," which is incorporated herein by reference in its entirety.

FIELD

The present description relates to computer-based techniques for modeling an electromagnetic field within electromagnetic and electromechanical devices.

BACKGROUND

During the manufacturing process of an electromagnetic and electromechanical device various manufacturing techniques are applied that physically alter the shape or dimensions of the device or individual components of the device. For example, electrical sheets are cut to their final shape using various techniques (e.g., punching, laser cutting, wire cutting, guillotine cutting, spark erosion, etc.), as part of the manufacturing process of electrical machines.

Computer-aided-design (CAD) software allows a user to construct and manipulate complex three-dimensional models. A CAD model usually includes a collection of interconnected topological entities (e.g., vertex, edges, faces, bodies), geometric entities (e.g., points, trimmed curves, trimmed surfaces), and/or meshes. A mesh often includes a piecewise discretization of the CAD model or a portion thereof. A mesh model may be generated from a previously generated CAD model, non-limiting examples of which include a model of a physical component such as an engine block of an automobile or a propeller. CAD models, meshes, and computer-based analysis techniques are used in modeling the behavior of physical (e.g., real-world) objects.

CAD models are often utilized to simulate the behavior of electromechanical and electromagnetic devices during the design and manufacturing process. During a design task, a CAD model can be used to predict the physical behavior of electromechanical devices or electromagnetic devices. For example, a CAD model may be utilized to predict the behavior of an electromagnetic field, allowing a designer to design the device based on knowledge of how a physical device embodying the CAD model will behave. Due to imperfections in modeling techniques, a physical device embodying a CAD model may exhibit physical behavior that when measured differs from the simulated physical behavior. The designer has to make design determinations based on measured data which determinations are incorporated into the CAD model in order to generate new predictions based on designer experience. This results in an iterative process that is timely and expensive. It is desirable to generate CAD models and CAD simulations that more accurately reflect the physical behavior of a physical device that physically embodies a computer implemented CAD model.

SUMMARY

Systems, methods, and computer readable media are provided for modeling core loss in an electromechanical or electromagnetic device. In various embodiments a method of performing steps to model core lose include obtaining a physical measurement of the core loss increase associated with a physical deformation of a material of the device. While executing a computer based electromechanical model simulator, a device model data structure describing a model of the device is accessed with the electromechanical model simulator. A first edge of the model of the device associated with a physical deformation of the device is identified. A finite element mesh is generated to include a single layer mesh comprising a plurality of mesh elements associated with the first edge of the finite element mesh. A core loss value is assigned to each of the plurality of mesh elements. Each of the core loss values representative of the physical measurement of the core loss increase of the material as a result of the physical deformation of the material. An electromagnetic model of the core loss of the electromechanical device is generated by performing a finite element analysis based on the finite element mesh and the single layer mesh.

In various embodiments systems for modeling core lose includes a processing system comprising one or more data processors, and a computer-readable medium encoded with instructions for commanding the processing systems to execute various steps including obtaining a physical measurement of the core loss increase associated with a physical deformation of a material of the device. While executing a computer based electromechanical model simulator, a device model data structure describing a model of the device is accessed with the electromechanical model simulator. A first edge of the model of the device associated with a physical deformation of the device is identified. A finite element mesh is generated to include a single layer mesh comprising a plurality of mesh elements associated with the first edge of the finite element mesh. A core loss value is assigned to each of the plurality of mesh elements. Each of the core loss values representative of the physical measurement of the core loss increase of the material as a result of the physical deformation of the material. An electromagnetic model of the core loss of the electromechanical device is generated by performing a finite element analysis based on the finite element mesh and the single layer mesh.

In various embodiments a computer-readable medium is encoded with instructions for commanding a processing system to implement steps for modeling core loss of an electromagnetic or of an electromechanical device including obtaining a physical measurement of the core loss increase associated with a physical deformation of a material of the device. While executing a computer based electromechanical model simulator, a device model data structure describing a model of the device is accessed with the electromechanical model simulator. A first edge of the model of the device associated with a physical deformation of the device is identified. A finite element mesh is generated to include a single layer mesh comprising a plurality of mesh elements associated with the first edge of the finite element mesh. A core loss value is assigned to each of the plurality of mesh elements. Each of the core loss values representative of the physical measurement of the core loss increase of the material as a result of the physical deformation of the material. An electromagnetic model of the core loss of the electromechanical device is generated by performing a finite element analysis based on the finite element mesh and the single layer mesh.

The subject matter described herein provides many technical advantages. As described below, the computer-based techniques of the present disclosure improve the functioning of a computer system as compared to conventional approaches because the techniques described herein enable a more accurate simulation device that is capable of generating a model, for example in the form of a mesh, and performing simulation techniques that create accurate descriptions of the measured physical behavior of electromechanical and electromagnetic devices, a non-limiting example of which is finite element analysis for measuring core loss throughout a device or device component. The computer-based techniques achieve such improvements through the use of a cut edge loss model that is capable of modeling loss changes resulting from manufacturing processes. The cut edge loss model achieves this by attributing predominantly all change caused by the manufacturing process to a core loss component while treating the permeability of the device material as unchanged. Further, in accordance with embodiments of the present disclosure, a physical object may be built or modified. Specifically, in embodiments, the meshes described herein represent a physical object or a portion thereof. Physical data (e.g., material properties, dimensions, etc.) associated with the physical object may be used in conjunction with the meshes. A computer-based analysis of the meshes may be performed, such as an electromagnetic field simulation or another type of analysis. Subsequently, the physical object may be built or modified based on the computer-based analysis. Such a physical object may be a physical device, like an electromagnetic motor, or it may be a component thereof, for example a material such as electrical steel that is used in forming or manufacturing a physical device. These technical advantages and others of the present disclosure are described in detail below.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 2 is a flowchart depicting operations of an example method for generating an electromagnetic model of an electromagnetic device or electromechanical device in accordance with embodiments of the present disclosure.

FIG. 3 depicts exemplary depictions of mesh elements and of a finite element mesh in accordance with embodiments of the present disclosure.

FIG. 5 illustrates an exemplary finite element mesh including an associated single layer mesh in accordance with embodiments of the present disclosure.

FIG. 6 illustrates an exemplary single layer mesh in accordance with embodiments of the present disclosure.

FIG. 8 illustrates an exemplary method of measuring magnetic properties of a material in accordance with embodiments of the present disclosure.

FIG. 9 illustrates measured values of core loss for sheets of material having variable width in accordance with embodiments of the present disclosure.

FIG. 10 illustrates simulated values of core loss based on cut-edge loss model in accordance with embodiments of the present disclosure.

FIG. 11 is a graphical depiction of setting the value of a data structure data point associated with a single layer element mesh in accordance with embodiments of the present disclosure.

FIG. 12 is a graphical depiction of exemplary data structure data points and associated values describing a physical material.

DETAILED DESCRIPTION

The manufacture of electromechanical and electromagnetic devices involves the use of various materials and processes. While a specific material under static conditions generally has static physical properties, manufacturing processes can physically alter a material in a way that alters the physical properties of the material in certain localized regions of the resulting device. For example, a common material used in the manufacture of electromechanical and electromagnetic devices is electrical steel. Electrical steel is used in many applications, such as in electrical transformer cores and in electrical motor rotors and stators. These applications require low losses for efficient operation. Electrical steel is an iron alloy designed to provide certain desirable magnetic properties. These properties include relatively high magnetic permeability, low hysteresis, and low core loss. While this discussion is in terms of steel, and in particular laminated steel, the techniques disclosed herein are applicable to any suitable material for which the electromagnetic properties may be simulated.

Figure 1:
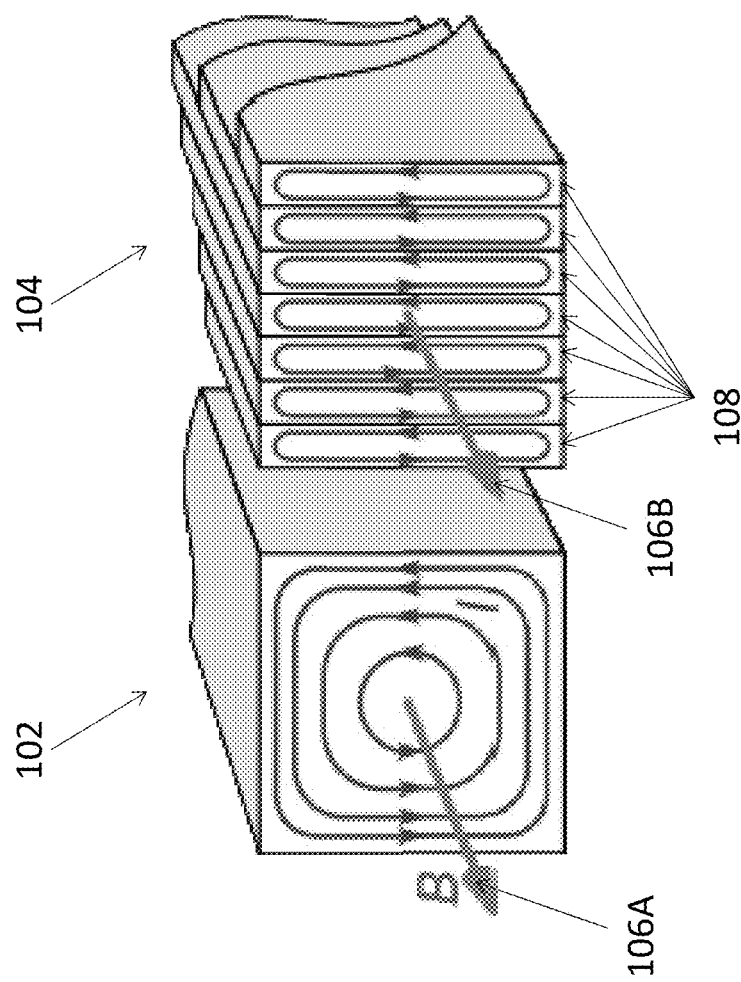
FIG. 1 is an illustration of magnetic fields within physical device components.

The manufacture of electrical steel involves the addition of silicon, cold rolling and lamination. FIG. 1 illustrates the difference between unlaminated steel 102 and laminated electrical steel 104. Laminated steel is steel that is processed comprising layers of steel instead of a single layer of steel. Laminated steel may comprise layer of differing types of steel, whereas non-laminated steel is typically a single homogeneous alloy. The laminated electrical steel 104 is illustrated as having a series of layers 108. Each has a unique magnetic field 106A, 106B as a result of processes utilized in their manufacture. During the manufacture of an electromechanical or electromagnetic device, the material utilized, whether laminated steel 104 or unlaminated steel 102, or some other material, various manufacturing processes such as cutting or punching are applied. These manufacturing processes can degrade the electrical properties of the material in regions near the cut edges.

In particular, lamination steel is cut to a final shape by manufacturing processes such as punching, laser cutting, wire cutting, guillotine cutting, spark erosion, etc. These processes deform the material and also deteriorate the magnetic properties of the lamination steel in the region local to the physical deformation. This deterioration increases the physically measurable core loss of the material and thereby the resulting electromechanical or electromagnetic device.

The physically measurable core loss increase may arise due to the following two reasons: (1) the plastic deformation and residual stress near the cut edge directly causes core loss increase in the deformation region; or 2) the permeability deterioration in the deformation region causes flux density increases in the non-deformation region in order to maintain the required total flux thereby causing core loss increase in the non-deformation region.

An accurate simulation an electromagnetic field within a manufactured electromechanical or electromagnetic device requires accurately modeling the increased core loss that occurs as a result of the manufacturing process.

The present disclosure relates generally to the design and manufacture of physical electromechanical and electromagnetic devices, or components thereof, based on computer-based simulations of the device's physical characteristics based on finite element analysis performed on finite element meshes as stored in a data structure. Computer based simulations may include electromagnetic field simulations for solving static, frequency-domain, and time-varying electromagnetic and electric fields. Embodiments include an electromagnetic simulator capable of performing a wide range of solution types for enabling a complete design flow for electromechanical and electromagnetic devices. Such a simulator may perform finite element analysis techniques. For example, simulators may be used to model magnetic transients in devices under rigid motion, whether it is rotational, translational, or non-cylindrical. Simulators may also model magnetic transients caused by coupling a device to an external circuit. Other magnetic transient behavior that may be modeled includes permanent magnet demagnetization analysis, core loss computation, lamination modeling, magnetic vector hysteresis, and magnetoresistive modeling in 2D or 3D. Electromagnetic field modeling may also include performing analysis of devices influenced by skin effects, proximity effects, and eddy/displacement current modeling under AC electromagnetic field. In further examples, simulators may include magnetostatic analysis and electric field analysis that may include the effects of transients, electrostatic/current flow analysis, and the ability to generate an equivalent circuit.

Given the number of materials and material vendors a device may be manufactured from, software based simulators typically rely on material suppliers to provide material data for modeling a particular material. When a material is selected for a device component, the physical properties associated with that material are typically stored in a data structure associated with the material. But, because the effects of all manufacturing processes cannot be predicted, suppliers publish material data having static physical properties. Thus, to accurately model core loss of a device as a result of a physical deformation of the material in a component of the device requires modeling the increase in core loss in a manner that is untethered from the supplied material properties. For example, electromagnetic degradation in laminate components and motor assemblies is difficult to predict because of the virgin material data provided by the material supplier will differ from the actual material performance when subjected to real operating conditions (e.g. after manufacturing processes are applied). One example of a computer based simulation package that models core loss is ANSYS™ MAXWELL™.

To illustrate features of the computer-implemented systems and methods described herein, reference is made to FIG. 2. This figure is a flowchart depicting operations of an example method for generating an electromagnetic model of an electromechanical device or a electromagnetic device in accordance with embodiments of the present disclosure. The electromagnetic model may be a simulation of the electromagnetic behavior of the electromagnetic device or electromechanical device. In embodiments, the model may be a simulation of the electromagnetic field within the device. At 200, a measurement of a device component material's core loss or core loss increase is obtained, for example by deforming the material and measuring the core loss associated with the deformation. The material is a material that is included in a component of the electromechanical device or a electromagnetic device.

At 202, a data structure comprising a computer model of a physical electromagnetic or electromechanical device is accessed. The electromagnetic or electromechanical device may be referred to as the "modeled device." The modeled device may comprise one material or a variety of materials. The model may be a CAD model that describes aspects of an electromechanical or electromagnetic device. In embodiments the model may or may not be in a finite element mesh form. If it is not, a finite element mesh may be generated from the CAD model. Or, a finite element mesh representation of the CAD model may have been generated previously. In embodiments, the model may be displayed via a graphical user interface (GUI) of a computer-aided design modeling system. The model may be stored in a data structure with additional data associated with the device mesh, or individual mesh elements of the device mesh. The model is either based on the modeled device, or the modeled device may be manufactured according to simulations and models generated based on model. If the model is a mesh model it may be modeled to include a regular mesh, or a poly mesh, or a hanging node mesh, or any suitable mesh or combination of mesh types.

As referred to herein, the terms "poly" and "polyhedral" denote cells with an arbitrary number of vertices and faces. The term "polyhedral" is also used herein in a generic sense when formally referring to polygons, such that there is no unnecessary distinguishing between two and three dimensions. As referred to herein, the term "regular mesh" denotes standard cells like tetrahedra, wedge, pyramid, hexahedra, etc. As referred to herein, the term "hanging node mesh" denotes meshes where there is only one hanging node per face or edge. As a general principal the techniques disclosed herein are applicable regardless of the form of the mesh, or the type of mesh elements it is composed of.

In embodiments, a mesh element, or cell, comprises faces, edges and vertices. As referred to herein, a "vertex" is a point at the corner of a cell, and a "cell" is either a two-dimensional (2D) area constrained by edges or a three-dimensional (3D) space constrained by faces. As referred to herein, a "face" is a two-dimensional space surrounded by straight lines, and an "edge" connects two vertices. If two 3-D objects share a face, they also share an edge, and the two terms may be used interchangeably herein when describing techniques in a general manner applicable to both 2-D or 3-D modeling and simulations.

Referring to FIG. 2, at 204, a cut edge of the model is identified. A cut edge of the model is associated with or includes a portion of the model edge that defines a deformation caused by a manufacturing process (e.g. the edge of the physical device along a physical cut or punch.) This may be a CAD model that describes the physical device in geometric terms. In an alternative embodiment the model is a mesh model, and a first edge of the mesh model is associated with or includes a number of mesh elements related to each other such that each share a common edge (or face) with the cut edge (or face) of the device mesh model, the common edge defining a space representative of the deformation caused by a manufacturing process.

A cut edge of the model is associated with a physical deformation of the modeled device. A cut edge of the model associated with the physical deformation of the modeled device may be identified, or selected, manually or it may be identified automatically by processes that are outside the scope of this disclosure. But, for example, a cut edge of a physical device model associated with a deformation can be identified by reference to another file that describes the deformation. Or, in another example, a process simulates the deformation of the modeled device by modifying the device model or device mesh, or by defining an edge of the device model or device mesh. A cut edge of a model may define an interface with an empty space or a void defined by a surface of the physical device.

In a mesh model, a cut edge of a mesh model may include an interface associated with one or more mesh elements and with an empty space or void defined by the mesh edge or face. In embodiments, an interface may also be associated with a second model or finite element mesh (e.g. a model of another component) such that the interface shape is defined by both the device model or mesh model and the second model or second finite mesh element. The cut edge of the mesh associated with a physical deformation may be an edge along which a cut or a punch of the modeled device may occur. The deformation may be caused by a manufacturing processes as discussed above.

At 206 a finite element mesh is generated to include single layer mesh along the cut edge of the device model as represented by the finite element mesh. The finite element mesh generated during this step is based on the cut edge and the physical device model. The single layer mesh element is a set of individual mesh elements. The user may specify the layer thickness of the single layer mesh. In embodiments, the set of mesh elements of the single layer mesh are a subset of mesh elements forming the entire finite element mesh of a device mesh. The single layer mesh may be generated simultaneously with the device mesh, e.g. in the same process, or the single layer mesh may be generated in a separate operation or process from generation of a device mesh. Like the device mesh the single layer may be 2-D or 3-D. In embodiments the single layer mesh is attached to the device mesh. The single layer mesh may be generated within the surface boundary of the device mesh along the cut edge. For display purposes the single layer mesh is attached to the device mesh directly or by conformal connections between mesh elements of each mesh.

At 208, a measured core loss increase value is obtained by physically measuring the core loss associated with a deformation of a particular material and is assigned to the single layer mesh. In embodiments, the value is distributed among the mesh elements of the single layer mesh. The value of the measured core loss increase is obtained by measurement beforehand and supplied to a data structure containing material data, for example data describing a material in terms of one or more of the physical properties of a material. The material data includes a value for effective cut depth based on the physical measurement of core loss in a selected material. At 210, an electromagnetic model is generated describing the electromagnetic behavior of the modeled device. The electromagnetic model may be a simulation of the electromagnetic behavior of the modeled device, for example the electric field within the device under specified conditions. In various embodiments, an electromagnetic model is generated by performing finite element analysis based on the device mesh and the single layer mesh having core loss increase data associated with the cut edge of the modeled device.

In accordance with embodiments of the present disclosure, a physical object may be built or modified. To model behavior of the physical object, a computer-based model corresponding to the physical object is generated. To perform certain analyses of the computer-based model (e.g., electromagnetic modeling, etc.), the meshes described herein may be generated, where such meshes may be piecewise discretizations of the computer-based model or a portion thereof. Each mesh is generated as a set of individual mesh elements, each having various data used for performing modeling and simulation of the physical behavior and physical qualities of a physical device being modeled. For example, each mesh element may have an associated material, and other associated physical data. Physical data (e.g., material properties, dimensions, etc.) associated with the physical object therefore may be used with the meshes to model the physical object, and various computer-based analyses can be performed using the meshes. The GUI of the computer-aided design modeling system may enable a user to view the model and mesh and to make various changes to them (e.g., geometry changes, changes to mesh parameters, etc.). Subsequently, the physical object may be built or modified based on the computer-based analyses.

FIG. 3 illustrates an exemplary device mesh 300 that may be accessed in step 202. Exemplary device mesh 300 is representative of a component of a modeled device, e.g. an electromechanical or electromagnetic device to be manufactured or modified based on simulations device behavior. For example, the component may be a portion of electrical steel, and the simulations may be to model electromagnetic field behavior within the electrical steel under various conditions. The portion of electrical steel has physical properties describing its shape and static properties, and may also include a material type. Within a mesh model, the electrical steel may for example have a material type defined as a particular type of electrical steel, such as lamination steel. In the mesh representation of the portion of electrical steel, the mesh comprises number of mesh elements each comprising its own device parameters, which may be uniform throughout the modeled device, or may differ depending on many factors. Device mesh 300 is comprised of a plurality of finite elements, or mesh elements, 302 (the ellipses are intended to illustrate that the mesh may extend away in the illustrated directions). The exemplary device mesh 300 has a cut edge 304 that models a physical cut edge in the physical modeled device that is the result of a deformation caused by a manufacturing process. As a result of the deformation the properties of the physical material forming the component of the modeled device in the region of the deformation will have been altered. In many cases, the core loss property of the physical material in the region of the deformation is altered by the manufacturing process causing an overall core loss increase within the device. Thus, to accurately model the electromagnetic behavior of the device, the overall core loss increase must be incorporated into the device behavior simulations.

Figure 4B:
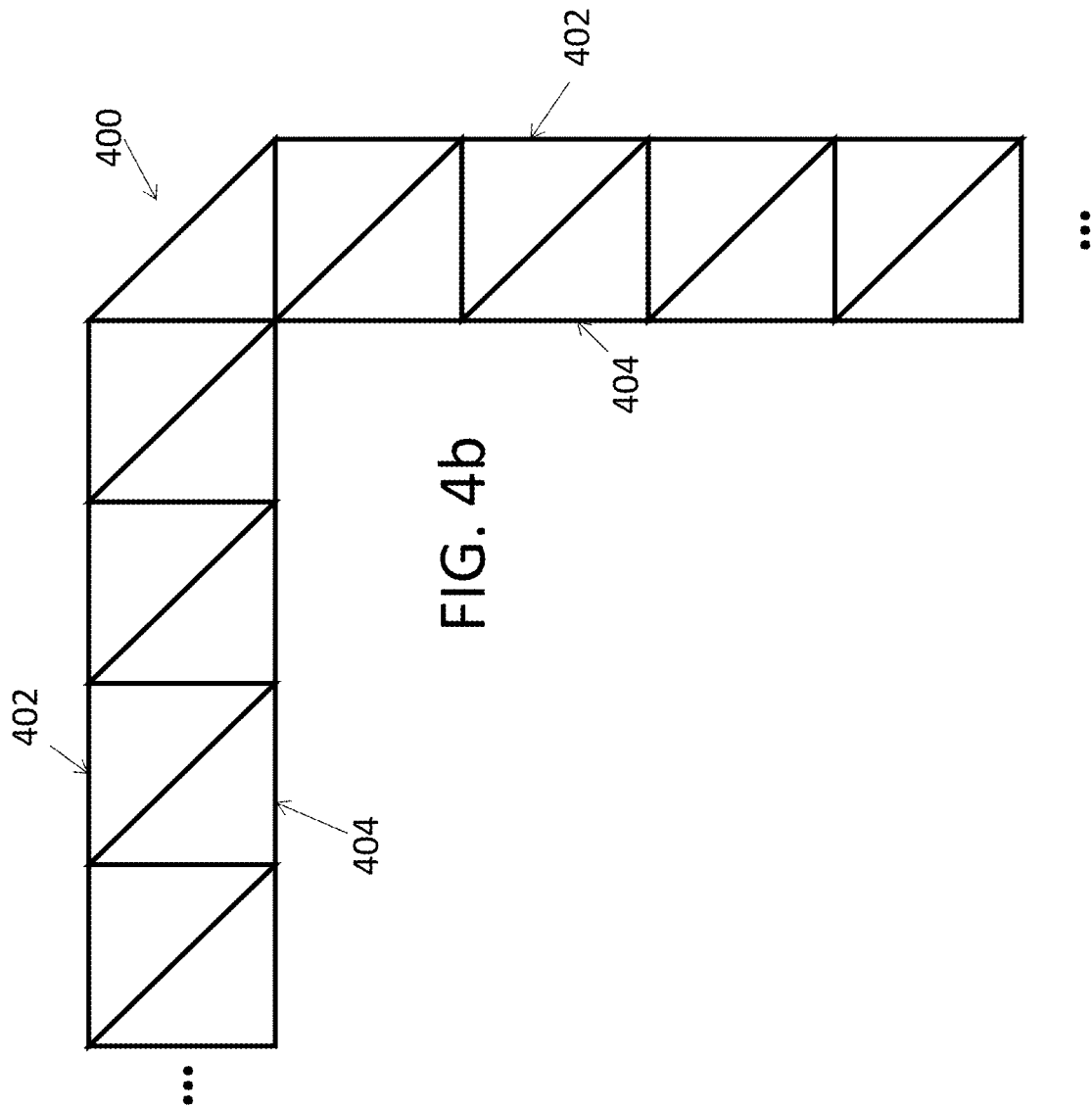
FIG. 4b depicts an exemplary single layer mesh in accordance with embodiments of the present disclosure.
Figure 4A:
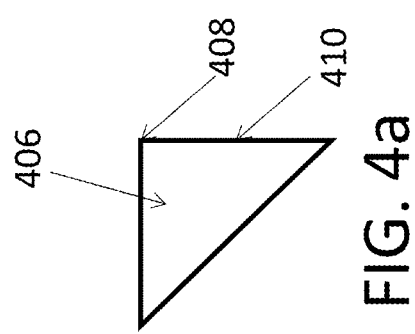
FIG. 4a depicts an exemplary mesh element in accordance with embodiments of the present disclosure.

FIGS. 4a and 4b illustrate an exemplary single layer mesh 400 generated in order to simulate electromagnetic behavior based on overall core loss increase. FIG. 4a illustrates a single finite element mesh element 406. Element 406 includes a plurality of vertices 408 and a plurality of edges 410 connecting the vertices 408. As shown in FIG. 4b, a number of mesh elements, like mesh element 406, are associated with each other so that they share a common edge with an interface edge 404 of the single layer mesh 400, or they include a vertex (or "vert") on the interface edge. Similarly, each element either shares an edge with an outer edge 402 of the single layer mesh 400 or has a vert on the outer edge 402 of the single layer mesh. In this way, at least one vert of each mesh element must be on the cut edge of the device mesh, or model, and all other verts must be on the interface layer. Information associated with the overall core loss increase of the modeled device is associated with the single layer mesh.

FIG. 5 illustrates a graphical presentation 500 of the single layer mesh 400 formed within the cut surface 304 of the device mesh 300. The interface 506 between the device mesh and the single layer mesh is along a shared boundary line between mesh elements. And, FIG. 6 illustrates a two dimensional (2D) single layer finite element mesh 600 comprising two-dimensional mesh elements, e.g. mesh element 606. The single layer mesh elements of the finite element mesh 600 have a layer thickness d LT and is formed within the cut edge surface 604.

Figure 7:
FIG. 7 illustrates various methods of measuring magnetic properties of a material in accordance with embodiments of the present disclosure.

FIG. 7 illustrates various techniques for measuring core loss and for determining the core loss increase caused by a cut or punch in the model device material causing physical deformation. Common methods of charactering magnetic material properties include Epstein frames 702, single sheet testers 704, and ring specimen 706. Any suitable method for determining magnetic properties of a device component material may be employed. For example, the single sheet tester method 704 the magnetic field distributes uniformly within all sliced cuts of a material, and may be employed to test the magnetic properties of specimens with variable width to consider the cut edge effects. The single sheet tester method is well suited to characterizing magnetic properties of laminate steel, or electrical steel. FIG. 8 illustrates a process of uniformly cutting slices of a tested metal sheet so that each slices obtains a progressively decreasing width as the number of slices of the material increases. By performing single sheet tester method 704 on the progressively decreasing number of slices, a cut edge loss model can be identified. A sheet under test has dimensions l and b. FIG. 9 illustrates measured property curves 900 of a single sheet tester method 704. To obtain the measured property curves 900, a sample fully processed electrical steel grade M235-35A having dimensions of l=260 mm by b=80 mm are cut by electrical discharge wire cutting (spark erosion). The outer edges of the 80 mm wide samples are assumed to be unaffected by the cutting technique. The length l dimension of the samples corresponds to the rolling direction of the sheet. Some of these samples are cut in smaller equal-width strips by guillotine cutting (a cutting technique that makes a small angle with the plane of the sheet), thereby simulating the actual punching techniques used in industrial processes. This results in N cut edges with N=6 for 4 strips, N=14 for 8 strips, N=26 for 14 strips, and N=42 for 22 strips. The resulting curves 900 of FIG. 9 illustrate the measured core loss of the material under a varying magnetic polarization at 50 Hz for several values of the number N of cut edges.

From these curves a cut edge loss model parameter for a particular material can be derived that is (1) independent of edge shapes (e.g., whether curved or straight); (2) independent of the direction of flux density (e.g., whether tangential or normal); and (3) independent of the magnitude of the flux density. The numerical values underlying the curves of FIG. 9 are shown below in Table 1 illustrating measured core loss varying with magnetic polarization at 50 Hz for various values of N.

| J (T) | N = 0 | N = 6 | N = 14 | N = 26 | N = 42 |
|---|---|---|---|---|---|
| 0.1 | 0.010 | 0.011 | 0.013 | 0.016 | 0.018 |
| 0.2 | 0.039 | 0.044 | 0.053 | 0.064 | 0.072 |
| 0.3 | 0.088 | 0.100 | 0.119 | 0.144 | 0.163 |
| 0.4 | 0.144 | 0.175 | 0.194 | 0.238 | 0.269 |
| 0.5 | 0.225 | 0.263 | 0.281 | 0.344 | 0.394 |
| 0.6 | 0.313 | 0.356 | 0.388 | 0.469 | 0.531 |
| 0.7 | 0.413 | 0.456 | 0.481 | 0.600 | 0.688 |
| 0.8 | 0.525 | 0.569 | 0.606 | 0.756 | 0.869 |
| 0.9 | 0.638 | 0.694 | 0.750 | 0.931 | 1.063 |
| 1 | 0.769 | 0.831 | 0.913 | 1.125 | 1.281 |
| 1.1 | 0.925 | 1.006 | 1.094 | 1.344 | 1.538 |
| 1.2 | 1.094 | 1.200 | 1.313 | 1.594 | 1.819 |
| 1.3 | 1.313 | 1.444 | 1.588 | 1.906 | 2.150 |
| 1.4 | 1.600 | 1.750 | 1.919 | 2.225 | 2.513 |
| 1.5 | 1.969 | 2.081 | 2.294 | 2.638 | 2.913 |
| 1.6 | 2.313 | 2.463 | 2.656 | 3.019 | 3.288 |
| 1.7 | 2.625 | 2.775 | 2.956 | 3.350 | 3.656 |
| 1.8 | 2.913 | 3.075 | 3.300 | 3.706 | 4.038 |

From these values, parameter $d_{eq}$ is determined based on:

$$d_{eq} = \Delta P_c / (p_0 S_c),$$

$$d_{eq} = (\Delta P_c / P_0)(V_0 / S_c) \quad (1)$$

where $P_c$ is core loss, $p_0$ is the core loss without the effect of a cut-edge (or the core loss when N=0), $S_e$ is the area of the cut edge, and $$\begin{cases} V_0 = l \times b \times \delta \\ S_c = N \times l \times \delta \end{cases}$$

with $\delta$ being the thickness of the single sheet. Thus (1) becomes:

$$d_{eq} = (\Delta P_c / P_0)(b/N) \quad (2)$$

If the measured core loss in Table 1 is expressed as $P_{ij}$, here i varying from 1 to n with n=18, and j varying from 0 to m with m=4, then based on (2), the simulated core loss at different $J_i$ and $N_j$ can be expressed as $$P_{ij}' = P_{i0} + \Delta P_j = P_{i0}(1 + d_{eq} N_j / b)$$

where $N_j$ represents 0, 6, 14, 26 and 41 for j=0, 1, 2, 3, and 4, respectively, and $P_{i0}$ are the measured core losses for different $J_i$ when N=0. The total error between the simulated and measured core losses will be $$\varepsilon = \sum_{i=1}^{n} \sum_{j=1}^{m} (P_{ij}' - P_{ij})^2. \quad (3)$$

By minimizing function (3), that is letting $$\frac{\partial \varepsilon}{\partial d_{eq}} = 0$$

then:

$$d_{eq} = b \frac{\sum_{i=1}^{n} \sum_{j=1}^{n} (P_{ij} - P_{i0}) P_{i0} N_j}{\sum_{i=1}^{n} \sum_{j=1}^{m} (P_{i0} N_j)^2}. \quad (4)$$

The parameter $d_{eq}$ is identified as 0.914 mm based on the measured core loss in Table 1. This property $d_{eq}$ called "Equivalent Cut Depth" can be added to material data for a particular material type within a simulator readable data structure describing that material type. The unit is of length type, and the default unit is "mm."

This parameter, $d_{eq}$, may be used in applying this core loss model to a cut edge model that is useful in a finite element analysis based simulation. Assuming the core loss per unit volume without considering cut-edge effects is $p_0$, the deformation depth is $d_c$, and the core loss increasing factor is $k_0$, then core loss in the deformation region will be $$P_c = (p_0 + k_0 p_0) V_d$$

where, $V_d$ is the volume of the deformation region, and is expressed as $$V_d = d_c S_c$$

with $S_c$ being the area of a cut edge. In general, it is difficult to identify the parameters $d_c$ and $k_0$ based on the measured loss increase $\Delta P_c$, which can be expressed as $$\Delta P_c = k_0 p_0 V_d = p_0 (k_0 d_c) S_c = p_0 d_{eq} S_c$$

where, again, $d_{eq}$ is the equivalent depth for the additional cut-edge loss, which can be identified from $$d_{eq} = \Delta P_c / (p_0 S_c).$$

In a finite element analysis in accordance with this disclosure, the single layer mesh is generated as described above. In embodiments, all mesh elements in this layer are labeled with a flag indicating the elements as single layer mesh elements for representing core loss increase for finite element analysis solvers. The additional loss due to cut edge is assumed to be uniformly distributed in the cut-edge layer region. The layer thickness, or layer depth, can be specified. The specified layer depth is not necessarily the same as the deformation depth which is usually unknown during design and simulation (because it is a function of the specific manufacturing process occurrence and for any particular cut or punch may differ slightly), however, it is necessary to ensure that the additional loss in the cut-edge layer is the same as that from measurement in the deformation region. For this reason, the loss in the cut-edge layer region is computed from $$P_L = p_0 V_L + k_0 p_0 V_d \quad (5)$$

where, $V_L$ is the volume of the cut-edge layer region, and is expressed as $$V_L = d_{LT} S_c \quad (6)$$

with $d_{LT}$ being the cut-edge layer depth. Combining (5) and (6), obtains $$P_L = k_c p_0 V_L$$

where $$k_c = 1 + k_0 d_c / d_{LT} = 1 + d_{eq} / d_{LT}.$$

In order to generate an electromagnetic model that accurately represents cut edge effects for core loss computation, the single layer depth for the cut edge is obtained for 2D meshes by:

$$d_{LT} = 2 S_m / L_{2v}$$

where $S_m$ is the mesh area, and $L_{2v}$ is the length of the mesh edge located on the cut edge, or on the layer interface. For a 3D cut-edge mesh, there exist multiple cases:

In case (1), a 3-vert face is located on the cut-edge surface, and the other 1 vert is on the layer interface.

In case (2), one 3-vert face is located on the layer interface, and the other 1 vert is on the cut-edge surface.

In case (3), one 2-vert edge is located on the cut-edge surface, and the opposite 2-vert edge is on the layer interface.

For the cases (1) and (2), the layer depth can be obtained from $$d_{LT} = 6 V_m / S_{3v}$$

where, $V_m$ is the mesh volume, and $S_{3v}$ is the 3-vert face area on the cut edge surface, or on the layer interface.

For case (3), we assume a first edge, from vert $v_1(x_1, y_1, z_1)$ to $v_2(x_2, y_2, z_2)$, is on the cut-edge surface, and a second edge, from $v_3(x_3, y_3, z_3)$ to $v_4(x_4, y_4, z_4)$, is on the layer interface. An inter point $p_1$, located between $v_1$ and $v_2$, is expressed as $$p_1 = v_1 + k_1 (v_2 - v_1).$$

Similarly, $$p_2 = v_3 + k_2 (v_4 - v_3).$$

Minimize the distance between $p_1$ and $p_2$ by optimizing $k_1$ and $k_2$, that is let $$d_2 = (p_2 - p_1) \cdot (p_2 - p_1) = \min$$

obtains the following:

$$\begin{bmatrix} a_{11} & a_{12} \\ a_{21} & a_{22} \end{bmatrix} \begin{bmatrix} k_1 \\ k_2 \end{bmatrix} = \begin{bmatrix} y_1 \\ y_2 \end{bmatrix} \quad (7)$$

where $$\begin{cases} a_{11} = (v_2 - v_1) \cdot (v_2 - v_1) \\ a_{21} = a_{12} = -(v_2 - v_1) \cdot (v_4 - v_3) \\ a_{22} = (v_4 - v_3) \cdot (v_4 - v_3) \end{cases}$$

and $$\begin{cases} y_1 = (v_3 - v_1) \cdot (v_2 - v_1) \\ y_2 = (v_1 - v_3) \cdot (v_4 - v_3) \end{cases}.$$

After $k_1$ and $k_2$ are obtained from (7), the layer depth is finally calculated from $$d_{LT} = |p_2 - p_1|.$$

For each single-layer cut-edge mesh element, the derived depth is utilized to calculate core loss increase. Simulated core loss curves 1000 based on this cut edge loss model are shown in FIG. 10, which match the measured curves 900 shown in FIG. 9 very well.

Figures 11, 12:
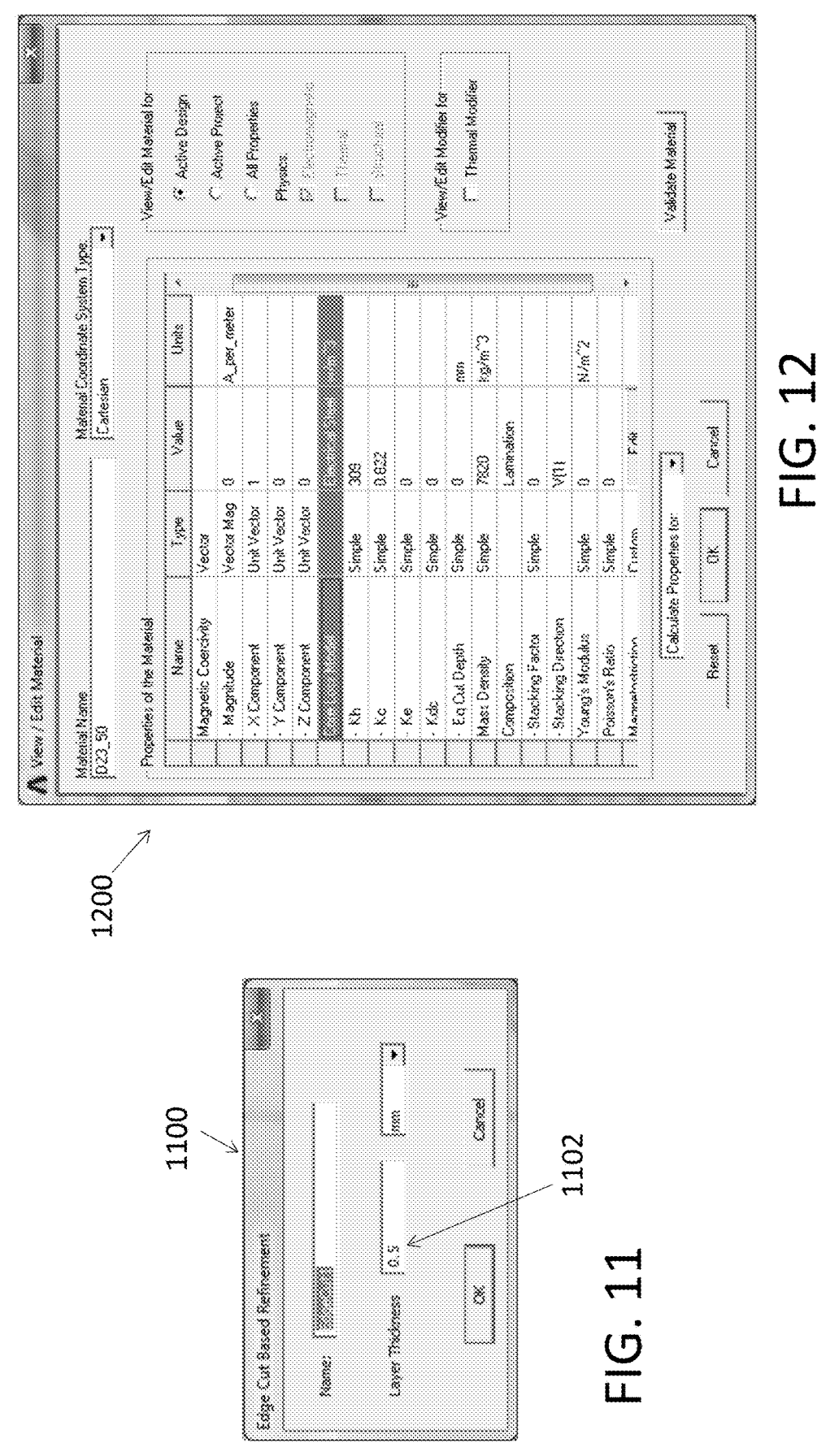

FIG. 11 and FIG. 12 illustrate exemplary user interfaces for specifying specific aspects of the modeling data. FIG. 11 illustrates setting a data value for the edge cut single layer mesh layer thickness. FIG. 12 illustrates a graphical display of selected contents of one or more data structures describing physical properties of a material. As can be seen, a core loss model includes a new equivalent cut depth ("Eq Cut Depth") value having a unit of length in mm. Based on these set values the finite element analysis techniques described above can be refined or improved.

Figure 13A:
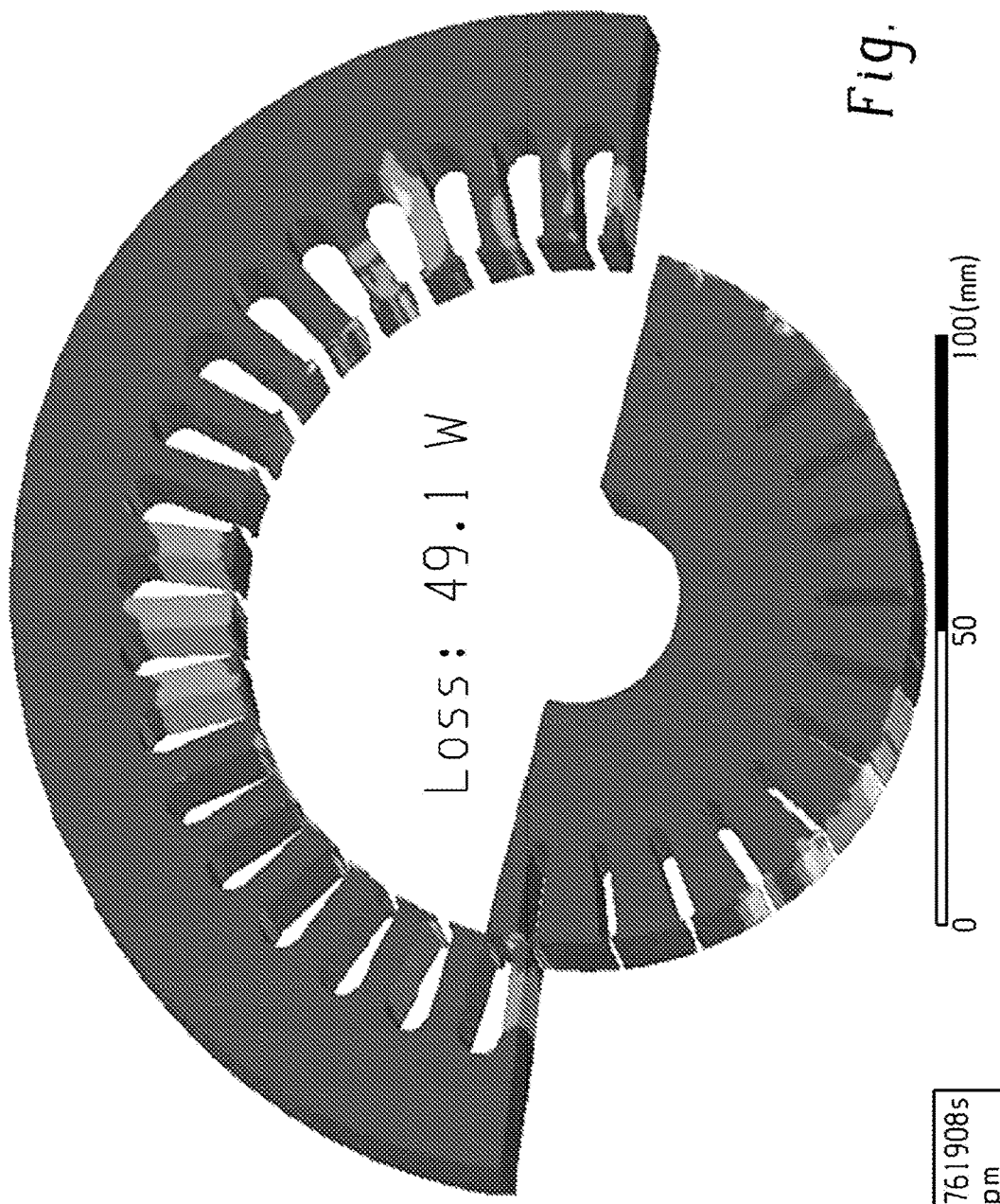
FIG. 13a illustrates an electromagnetic model of an electromagnetic or electromechanical device based on a finite element analysis.
Figure 13B:
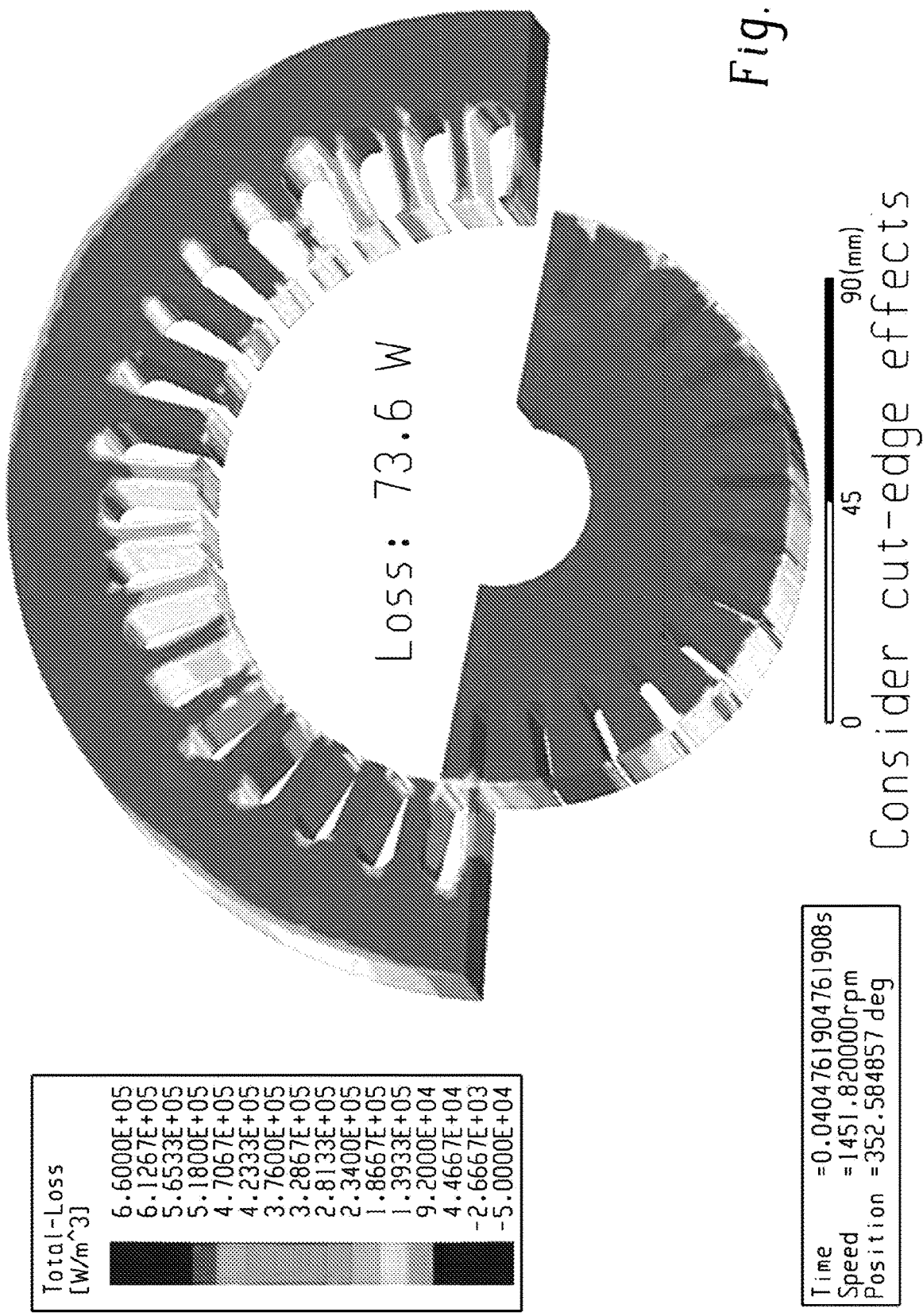
FIG. 13b illustrates an electromagnetic that is generated by an electromagnetic simulator based on a finite element analysis performed upon a finite element mesh model in accordance with this disclosure.

FIGS. 13a-b illustrate the practical advantages obtained from the techniques described herein. FIG. 13a illustrates an electromagnetic model of an electromagnetic or electromechanical device. The electromagnetic model is generated by an electromagnetic simulator based on a finite element analysis performed upon a finite element mesh model without considering the effects of core loss increase caused by the physical deformation of the material during the manufacturing process as described herein. FIG. 13b illustrates an electromagnetic field that is generated by an electromagnetic simulator based on a finite element analysis performed upon a finite element mesh model in accordance with this disclosure. The electromagnetic model of FIG. 13b is generated considering the effects of core loss increase caused by the physical deformation of the material during the manufacturing process as described herein.

We claim:

1. A processor-implemented method of modeling core loss of an electromechanical device comprising:
   while executing a computer based electromechanical model simulator, accessing, with the electromechanical model simulator, a model of an electromechanical device having a physical deformation characterized by a cut edge associated with a material;
   generating a finite element mesh including a single layer mesh for effects of core loss increase caused by the physical deformation, the single layer mesh comprising a plurality of elements each comprising: (i) one or more vertices on the cut edge and (ii) one or more separate vertices residing on an interface edge of the finite element mesh;
   determining a layer depth of the single layer mesh based on a volume of a deformation region according to a cut edge model and based on a number of vertices on the cut edge and a number of the separate vertices residing on the interface edge of the finite element mesh;
   generating an electromagnetic model of the core loss of the electromechanical device by performing a finite element analysis based on the finite element mesh and the single layer mesh, wherein the core loss of the electromechanical device includes the core loss increase based on the layer depth calculated and an equivalent cut depth associated with the material.

2. The method of claim 1, wherein the model of the electromechanical device describes the electromechanical device in terms of related geometrical entities each including a reference to the material, and wherein the material of the electromechanical device is further described in terms of the equivalent cut depth value.

3. The method of claim 2, wherein a physical object is built or modified based on the finite element analysis.

4. The method of claim 3, wherein the electromechanical device comprises lamination steel shaped by a manufacturing process, and the physical deformation of the electromechanical device is a result of a cut or punch in the lamination steel.

5. The method of claim 4, wherein the manufacturing process is punching or cutting the lamination steel.

6. The method of claim 4, wherein the single layer mesh is formed within a device mesh surface associated with the cut edge.

7. The method of claim 6, wherein the plurality of mesh elements forming the single layer mesh is a subset of a set of mesh elements comprising the finite element mesh.

8. The method of claim 7, wherein the set of mesh elements comprising the finite element mesh are generated by the simulator during a same operation that generates the subset of mesh elements comprising the single layer mesh.

9. The method of claim 6, wherein the computer based electromechanical model simulator is a core loss modeling simulator.

10. The processor-implemented method of claim 1, wherein the equivalent cut depth value is based on a set of measurements of core loss increase obtained from a physical material sample by applying various cuts to the physical material sample causing the physical material sample to have a plurality of cut members.

11. The processor-implemented method of claim 1, wherein the cut edge includes a first edge of a two dimensional model.

12. The processor-implemented method of claim 1, wherein the cut edge includes a first face of a three dimensional model.

13. The processor-implemented method of claim 1, wherein the finite element analysis includes a simulation of an electromagnetic field within the electromechanical device.

14. The processor-implemented method of claim 1, wherein a manufacturing process for the electromechanical device comprises at least one of laser cutting, wire cutting, guillotine cutting, or spark erosion.

15. A computer implemented system for modeling core loss of an electromagnetic or of an electromechanical device comprising:
   a processing system comprising one or more data processors;
   a computer-readable medium encoded with instructions for commanding the processing systems to execute steps of a method comprising:
      while executing a computer based electromechanical model simulator, accessing, with the electromechanical model simulator, a model of an electromechanical device having a physical deformation characterized by a cut edge associated with a material;
      generating a finite element mesh including a single layer mesh for effects of core loss increase caused by the physical deformation, the single layer mesh comprising a plurality of elements each comprising: (i) one or more vertices on the cut edge and (ii) one or more separate vertices residing on an interface edge of the finite element mesh;
      determining a layer depth of the single layer mesh based on a volume of a deformation region according to a cut edge model and based on a number of vertices on the cut edge and a number of the separate vertices residing on the interface edge of the finite element mesh;
      generating an electromagnetic model of the core loss of the electromechanical device by performing a finite element analysis based on the finite element mesh and the single layer mesh, wherein the core loss of the electromechanical device includes the core loss increase based on the layer depth calculated and an equivalent cut depth associated with the material.

16. A non-transitory computer-readable medium encoded with instructions for commanding a processing system to implement steps for modeling core loss of an electromagnetic or of an electromechanical device, the steps comprising:
   while executing a computer based electromechanical model simulator, accessing, with the electromechanical model simulator, a model of an electromechanical device having a physical deformation characterized by a cut edge associated with a material;

generating a finite element mesh including a single layer mesh for effects of core loss increase caused by the physical deformation, the single layer mesh comprising a plurality of elements each comprising: (i) one or more vertices on the cut edge and (ii) one or more separate vertices residing on an interface edge of the finite element mesh;

determining a layer depth of the single layer mesh based on a volume of a deformation region according to a cut edge model and based on a number of vertices on the cut edge and a number of the separate vertices residing on the interface edge of the finite element mesh, the cut edge model using a first calculation operation when there are (a) three vertices on the cut edge and a single vertex on the interface edge of the finite element mesh, or (b) three vertices on the cut edge surface and a single vertex on the cut edge, the cut edge model using a second calculation operation when there are two vertices on the cut edge and two vertices residing on the interface edge of the finite element mesh;

generating an electromagnetic model of the core loss of the electromechanical device by performing a finite element analysis based on the finite element mesh and the single layer mesh, wherein the core loss of the electromechanical device includes the core loss increase based on the layer depth calculated and an equivalent cut depth associated with the material.

* * * * *